United States Patent [19]

Taniguro

[11] Patent Number: 5,373,368

[45] Date of Patent: Dec. 13, 1994

[54] SERIAL RECORDING METHOD AND APPARATUS FOR ONE-WAY AND TWO-WAY RECORDING

[75] Inventor: Masahiro Taniguro, Yokohama, Japan

[73] Assignee: Canon Kabushiki Kaisha, Tokyo, Japan

[21] Appl. No.: 756,279

[22] Filed: Sep. 6, 1991

[30] Foreign Application Priority Data

Sep. 10, 1990 [JP] Japan .................. 2-237076

[51] Int. Cl.⁵ .................. H04N 1/32; H04N 1/034; B41J 19/30; B41J 29/38

[52] U.S. Cl. .................. 358/296; 358/438; 400/323; 347/3; 347/12

[58] Field of Search ............. 358/296, 426, 434, 436, 358/438, 447, 486, 497, 400, 401, 502; 346/1.1, 140 R; 400/121, 323

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,542,384 | 9/1985 | Tazaki .................. 346/33 |
| 4,558,333 | 12/1985 | Sugitani et al. . |
| 4,663,671 | 5/1987 | Seto .................. 358/438 X |
| 4,723,129 | 2/1988 | Endo et al. . |
| 4,740,796 | 4/1988 | Endo et al. . |
| 4,876,604 | 10/1989 | Nobuta .................. 358/434 X |
| 5,041,915 | 8/1991 | Hirota et al. .................. 358/434 X |
| 5,075,784 | 12/1991 | Momose .................. 358/447 |

FOREIGN PATENT DOCUMENTS

| | | |
|---|---|---|
| 3343355 | 6/1984 | Germany . |
| 54-56847 | 5/1979 | Japan . |
| 59-123670 | 7/1984 | Japan . |
| 59-138461 | 8/1984 | Japan . |
| 60-048366 | 3/1985 | Japan . |
| 60-17260 | 4/1985 | Japan . |
| 60-166464 | 8/1985 | Japan . |
| 62-253457 | 11/1987 | Japan . |

Primary Examiner—Benjamin R. Fuller
Assistant Examiner—Eric Frahm
Attorney, Agent, or Firm—Fitzpatrick, Cella, Harper & Scinto

[57] ABSTRACT

A serial recording apparatus is disposed for recording onto a recording medium while moving relatively a recording head with a plurality of recording elements arranged and the recording medium in a main scan direction and a sub scan direction which are orthogonal to each other. The apparatus includes a receiving unit for receiving a recording signal, and a recording controller means for enabling the recording head to record in one-way or two-way movement depending on the information of pixel density which the receiving unit receives.

32 Claims, 9 Drawing Sheets

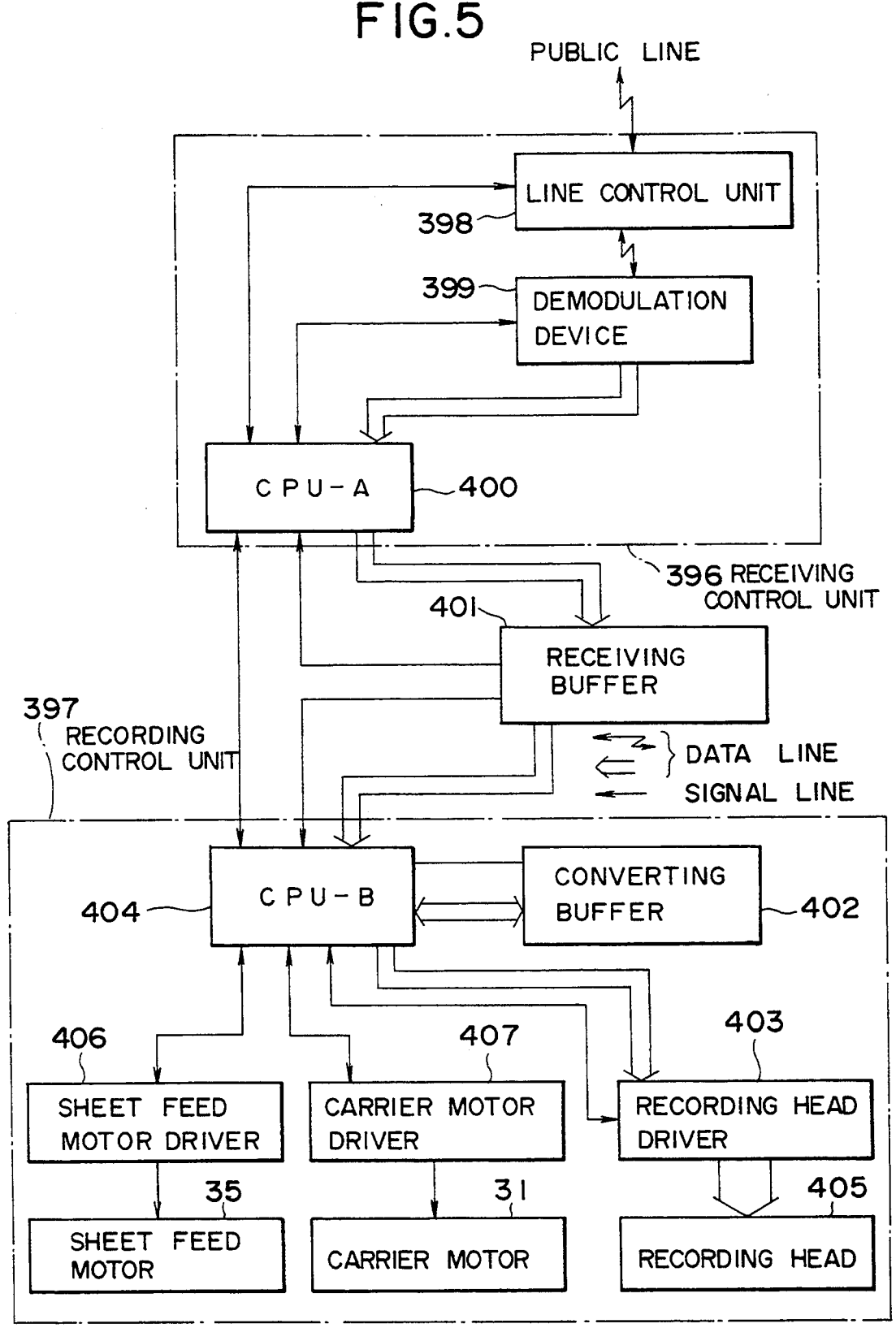

SERIAL RECORDING METHOD AND APPARATUS FOR ONE-WAY AND TWO-WAY RECORDING

BACKGROUND OF THE INVENTION

1. Field of the Invention

The present invention relates to a serial recording method and apparatus applicable to an office equipment or communication equipment such as a facsimile terminal equipment, a copying machine, a word processor, an electronic typewriter, a personal computer, or an office computer, and in particular preferably useful for the facsimile terminal equipment.

A preferred embodiment of the present invention is one of using an ink jet recording method of recording by depositing ink droplets formed by the discharge of ink onto a recording medium such as a sheet.

2. Related Background Art

In the facsimile communication, an apparatus allowing for the high speed transmission/reception has various advantages because it can improve the usability and shorten the occupying time on the telephone line, reducing the running cost.

To meet the requirement of higher speed at the reception, not only a receiving control circuit for processing received data but also a recording apparatus must be made faster. Thus, conventionally a recording method was mostly used in which received lines were recorded at one time while conveying the sheet sequentially, using a thermosensible line head capable of recording a received image at high speed.

However, in the recording method using a conventional thermosensible line head, the recording speed is higher, but the recording head is expensive, so that it is difficult to provide an inexpensive facsimile terminal equipment. Furthermore, as the recording sheet is a thermosensible paper, there is a problem that the fading or tarnishing due to a long storage makes it impossible to record onto the recording sheet.

In an apparatus using the so-called serial recording method in which the image reproduction is performed in such a way as to record one line by driving a plurality of recording elements laid on the recording head while reciprocating the recording head, and repeat the above recording plural times while feeding the recording sheet, there have been proposed various recording apparatuses of facsimile as the recording head is cheaper than in the line head recording method. As this method includes several recording methods capable of recording onto an ordinary paper such as so-called wire dot method or thermal transfer method, there is no problem with the preservation of recording papers.

However, most of these methods have the recording speed less than the receiving speed, and generally, when the recording apparatus having a recording speed slower than the receiving speed is used, it is necessary to provide a large amount of receiver buffer such as memory IC within the apparatus, which may increase the cost of the apparatus. Also, there is a method in which image data once received at higher speed is stored in a floppy disk or the like and later recorded at slower speed in the serial recording method, but similarly increasing the cost of the apparatus.

Recently, the recording speed in the serial recording method has been remarkably improved, and there is an attempt to perform the real time recording by reducing the reception buffer to a small amount. Particularly, among the ink jet methods of recording by discharging the ink directly onto the recording sheet, the recording head using the ink jet method of discharging the ink with the pressure of film boiling in the ink caused by electricity-heat converters for generating the thermal energy provided as the energy element for discharging the ink makes it possible to carry out the recording at high speed and high definition, and further to form more recording elements easily within a single head, so that it is optimal for the recording apparatus of the facsimile apparatus which records a received image at high definition and high speed.

On the other hand, in the standards of G3 facsimile, two apparatus constants of horizontal resolution (main scan line density) and vertical resolution (sub-scan line density) are defined.

The main scan line density signifies the number of pixels per mm in a main scan direction (horizontal direction in this case), in which in the G facsimile, there are provided two kinds of densities for a standard resolution of 3.85 pixels per mm (generally called the "standard" or "normal") and a high resolution of 7.7 pixels per mm (generally called the "fine").

Ordinarily, the recording pixel density of a serial recording head is set in accordance with the pixel density in the fine mode in order to record a received image in the fine mode at the same size as a transmitted original without defects of data. Therefore, when the "normal" image is received, the control is made so as to record one pixel with two pixels of the recording head.

Also, usually, at the transmission and reception in the normal mode, it is intended to make the transmission and reception at high speed and thus inexpensively, with almost no considerations of the recording quality of image, but at the transmission and reception in the fine mode, the recording quality of image is more considered than the transmission and reception speeds.

However, as previously described, when the "normal" image is received, the control is made so as to record one pixel with two pixels of the recording head, and the amount of data to be received is less than that in receiving the "fine" image.

Accordingly, the transmission time per unit page of recording data can be essentially less in the normal mode, in which the communication cost can be reduced. However, as previously described, taking into consideration the requirements for the cost reduction and smaller construction of apparatus, it is requisite to constitute the receiver buffer with a smaller capacity, in which when the recording speed is slow, the transmission speed must be also slower on the transmission side, thereby increasing the waiting time unusable for the transmission of data, whereby there was a problem that the occupying time of line would be increased, irrespective of the transmission of the "normal" image data, resulting in a higher running cost.

Thus, in a serial recording method with the ink jet method, or other serial recording methods at higher speed, it is conceived that the recording should be enabled in both directions of reciprocatory movement of the recording head to meet the recording speed corresponding to the reception at high speed, but generally, in a "forward" direction and a "backward" direction of reciprocatory recording, image shift may arise at the juncture between the "forward" and "backward" movements due to a backlash of the driving system for moving the recording head, whereby the image quality might be sometimes degraded.

Also, the recorded image may be sometimes differently formed between the "forward" and "backward" directions due to the shape of the recording head, and the way of depositing the ink may be different between the recording in the "forward" direction and that in the "backward" direction, causing the fluctuation of recording density, whereby there was a problem that the image quality could not be sufficiently obtained in recording the "fine" image.

On the other hand, assuming that the number of lines recordable in one movement of the recording head in the left and right directions is A lines/sec in the line mode, it is A/2 lines/sec in the normal mode because the control is made so as to record one pixel with two pixels of the recording head in the normal mode. By the way, when the transmission rate of image data is 1 lines/sec, a receiver buffer for reserving the image data as large as (1-A/2) lines/sec is necessary in the normal mode if the recording speed is less than the transmission rate. Accordingly, there was a problem that when the recording speed was slow, it was necessary to increase the capacity of required receiver buffer, which may increase the cost of apparatus.

SUMMARY OF THE INVENTION

The present invention was made based on the above described related art, and from a new viewpoint conventionally unforeseen.

Also, the present invention is to resolve the technical problems of the above described related art, in which it is an object of the present invention to provide a serial recording method and a serial recording apparatus, which can reduce the cost of apparatus and the running cost, with a sufficient recording precision and quality.

More specifically, it is an object of the present invention to provide a serial recording method and an apparatus therefor in which the cost of apparatus can be reduced by making smaller the capacity of recording means such as receiving buffer for storing a received signal temporarily. Further the running cost can be reduced by decreasing the line occupying time for recording the "normal" image having a smaller data amount, and a sufficient recording precision or image quality can be satisfied in recording the "fine" image.

Also, it is another object of the present invention to provide a serial recording method for recording onto a recording medium while moving relatively a recording head with a plurality of recording elements arranged and the recording medium in a main scan direction and a sub scan direction which are orthogonal to each other, characterized by including:

receiving a recording signal; and
making the one-way recording with the recording head if a received recording signal indicates the recording of image at high resolution, or making the two-way recording with the recording head if it indicates the recording of image at a lower resolution than the above-mentioned high resolution.

Also, it is another object of the present invention to provide a serial recording apparatus for recording onto a recording medium while moving relatively a recording head with a plurality of recording elements arranged and the recording medium in a main scan direction and a sub scan direction which are orthogonal to each other, characterized by comprising:

a receiving unit for receiving a recording signal; and recording control means for causing the recording head to perform the one-way or two-way recording in accordance with the information of pixel density which the recording signal received by the receiving unit has.

Note that in the present invention, "recording onto a recording medium while moving relatively a recording head and the recording medium in a main scan direction and a sub scan direction which are orthogonal to each other" includes not only the instance of recording while moving the recording head in the main scan direction, but also the instance of recording while moving the recording medium in the main scan direction with the recording head fixed; it also includes not only the instance of recording while conveying the recording medium in the sub scan direction, but also the instance of recording while moving the recording head in the sub scan direction with the recording medium fixed.

BRIEF DESCRIPTION OF THE DRAWINGS

FIG. 5 is a block diagram showing a receiving control unit and a recording control unit of a control substrate 3 as shown in FIG. 1.

DETAILED DESCRIPTION OF THE DRAWINGS

The examples of the present invention will be described below in detail with reference to the drawings.

Figure 1:
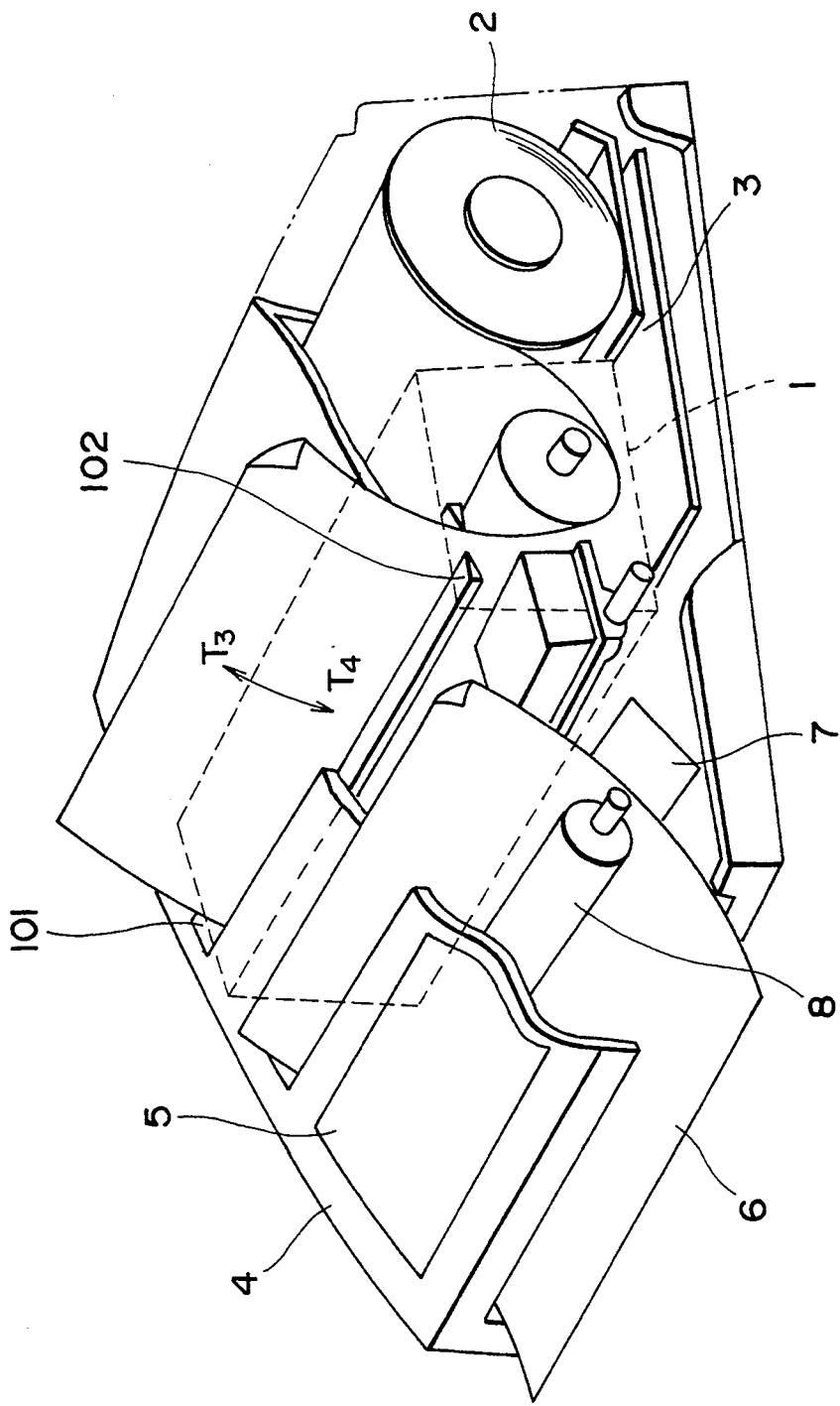
FIG. 1 is a perspective view for showing the appearance of a facsimile equipment in one example of the present invention.

FIG. 1 shows one example of the present invention.

In FIG. 1, 1 is a recording apparatus for recording a received image. 2 is a sheet for use as the recording medium which is wound as a roll. 3 is a control substrate for controlling the entire facsimile equipment, 4 is an apparatus body, and 5 is a control panel on which a dial button (not shown), a start switch, etc. are disposed. 101 is a paper exhaust opening for exhausting the recorded sheet, and 102 is a cutter for cutting the recorded sheet which has been exhausted at the completion of recording.

6 is a transmit original, 7 is a read sensor, and 8 is a read roller, in which the transmit original 6 is read by the sensor 7 for transmission of the original.

Figure 2:
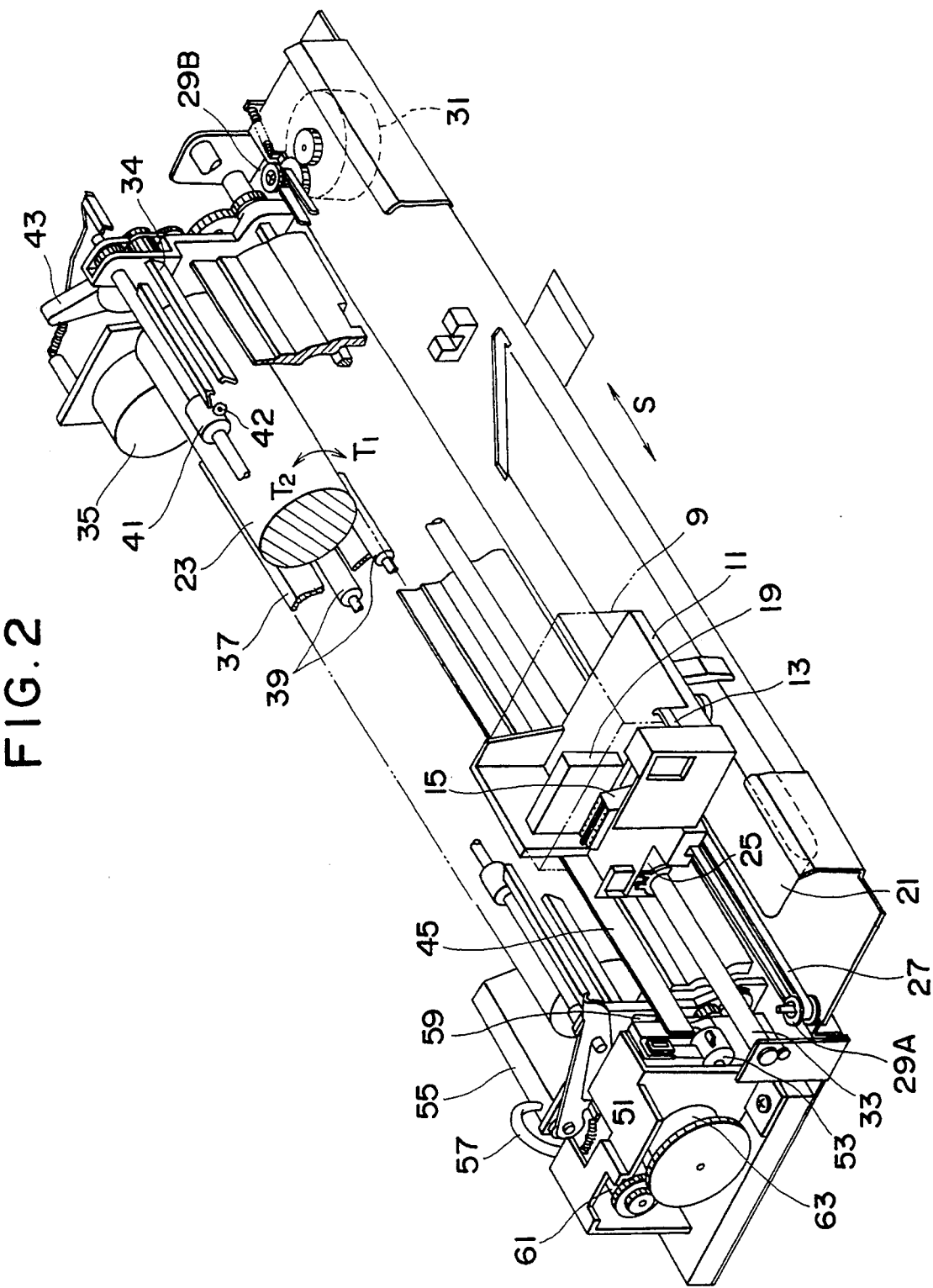
FIG. 2 is a view showing the constitution of a recording apparatus portion of the facsimile equipment as shown in FIG. 1.

FIG. 2 shows an internal constitution of the recording apparatus 1 as shown in FIG. 1.

Here, 9 is a head cartridge having an ink jet recording head (hereinafter referred to as a recording head), and 11 is a carrier reciprocating the head cartridge 9 mounted thereon in the S direction as shown.

13 is a hook for mounting the head cartridge 9 onto the carrier 11, and 15 is a lever for manipulating the hook 13. 19 is a support plate for supporting an electrical connection section to the head cartridge 9. 21 is a flexible cable for connecting its electrical connection section to a control section 3 of main body.

33 is a guide shaft for guiding the carrier 11 in the S direction of FIG. 2, which is inserted through bearings 25 of the carrier 11. 27 is a timing belt for transmitting the power to move the carrier 11 secured thereto in the S direction of FIG. 2, which is looped under tension about pulleys 29A, 29B disposed on both side portions of the apparatus. A motive power is transmitted to one pulley 29B via a transmission, a gear, by a carrier motor 31. 23 is a conveying roller for conveying a sheet for recording, as well as regulating a record plane of the sheet, and which is driven by a conveying motor 35. 37 is a paper pan for conducting the sheet to a recording position. 39 is a pinch roller, disposed on the passage for feeding the sheet, for pressing the sheet against the conveying roller 23 for conveyance. 41 is a paper exhausting roller for exhausting the sheet to a paper exhausting opening 101, which is disposed downstream of the recording position in a sheet conveying direction.

42 is a spur provided correspondingly to the paper exhausting roller 41, for pressing the paper exhausting roller 41 via the sheet and yielding a force for conveying the sheet with the paper exhausting roller 41. 45 is a present bar for suppressing the floating of the sheet in the neighborhood of recording position to secure a close contact against the conveying roller 33. 43 is a release lever for releasing the engagement between a pinch roller 39, the presser bar 45 and the spur 42 in setting the sheet.

51 is a cap formed of an elastic material, rubber, which is opposed to an ink discharge port formation face of the recording head placed at a home position, and supported to be able to attach to/detach from the recording head. The cap 51 is used for protecting the recording head when not recorded, or in a discharge recovery processing (as thereinafter described) for the recording head.

The discharge recovery process is one of removing discharge faulty factors such as air bubbles or dusts, or thickened ink unsuitable for recording (called a predischarge) by discharging the ink through all discharge ports by driving energy generation elements provided inwardly of the ink discharge ports and useful to discharge the ink, and apart from that, removing discharge faulty factors by compulsorily discharging the ink through the discharge ports.

53 is a pump used to exert a suction force the compulsory discharge of ink and to suck the ink received within the cap 51 in performing the discharge recovery processing with such compulsory discharge or predischarge. 55 is a waste ink tank for reserving waste ink sucked by the pump 53, and 57 is a tube communicating the pump 53 to the waste ink tank 55.

59 is a blade for wiping the discharge port formation face of the recording head, which is supported to be movable between a position for wiping the head during the movement of the head which projects toward the recording head, and a retracted position at which it does not engage the discharge port formation face. 61 is a pump motor, and 63 is a cam mechanism for driving the pump 53 and moving the cap 51 and the blade 59 by receiving the power from the pump motor 61.

Figure 3:
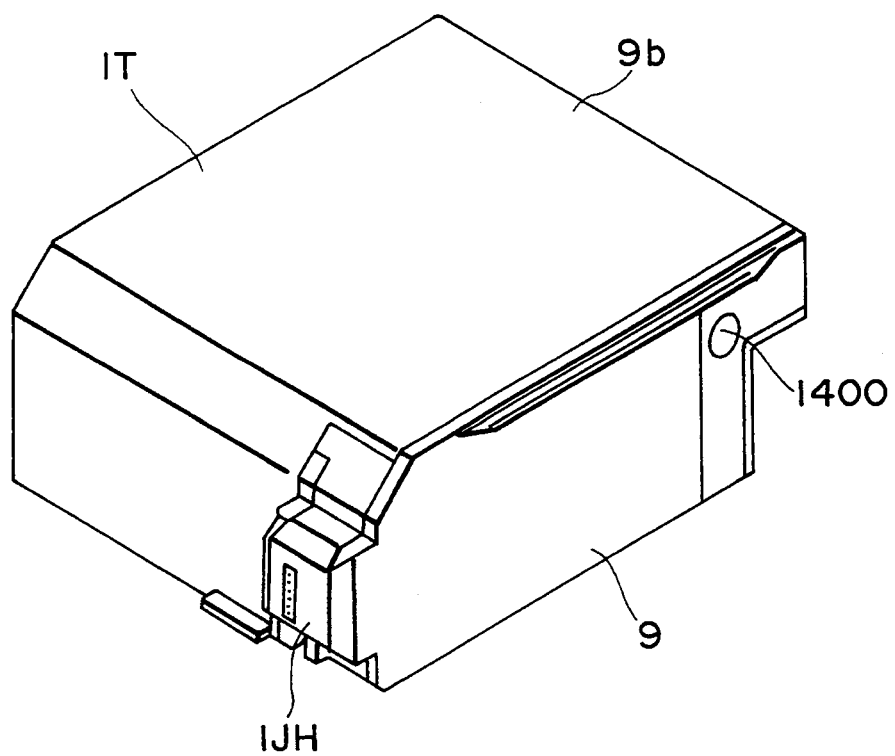
FIG. 3 is a view showing the appearance of a head cartridge as shown in FIG. 2.

FIG. 3 shows the head cartridge as shown in FIG. 2. This is a disposable type of being integral with an ink storage portion which is an ink supply source.

A recording head portion IJH of this cartridge has a heater board consisting of a plurality of electricity-heat converters (called the discharge heater) and the wiring of A1 or the like for supplying the power, which are formed using the film formation technique. The recording head portion IJH comprises a supply tank which serves as a sub tank for receiving the ink-supplied from an ink reservoir portion IT which is the ink supply source and conducting the ink to a common liquid chamber formed by joining the heater board and a ceiling plate. The ink reservoir portion IT contains an absorbing member for impregnating the ink and is disposed within an ink tank main body 9b. 1400 is an atmosphere communicating opening provided in a lid member for communicating an inside of the cartridge to the atmosphere. Inwardly of the atmosphere communicating opening is disposed a water repellent material which prevents the leakage from the atmosphere communicating opening 1400.

The ink is supplied from the ink cartridge to the supply tank constituting the recording head, passes through the interior of the supply tank, and then is introduced through an inlet port into the common liquid chamber. And a desired recording image is obtained by heating a plurality of discharge heaters with a desired pattern, based on a predetermined recording signal, and discharging the ink by the use of the thermal energy thus generated.

Note that the above recording method is a method of recording with fine liquid droplets formed by the thermal energy, among the ink jet recording methods, and allows the higher definition and higher speed of recording to be achieved. In this example, 64 discharge heaters and respective ink discharge parts are provided, thus forming the so-called 64-dot head. Thereinafter, they are referred to as recording elements, and explained as N dots.

In the following, the discharge principle of an ink jet recording head portion appropriately useful for the recording apparatus of the present invention will be described.

The recording head portion applied to the ink jet recording apparatus typically comprises the minute liquid discharge port (orifice), the liquid channel, the energy acting portion provided on a part of the liquid channel, and energy generating means for generating the liquid droplet forming energy which is exerted onto the liquid in the acting portion, and is exchangeable. As the energy generating means for generating such energy, there is such a constitution as using an electro-mechanical transducer such as a piezoelectric element, discharging fine liquid droplets with the action of the heat generated by an electromagnetic wave such as a laser which radiates the liquid to absorb the energy and generate the heat, or discharging liquid droplets by heating the liquid with the electricity-heat converter.

Among them, the recording head portion for use with the ink jet recording method of discharging the liquid with the thermal energy can perform the recording at high resolution, because the liquid discharge port (orifice) can be arranged at high density to form fine liquid droplets by discharging the recording liquid. Also, the recording head portion using the electricity-heat converter as the energy generating means allows for a compact constitution of recording head portion as a whole, and can utilize sufficiently the merits of the IC technology or microprocess technology which has been remarkably developed in the recent semiconductor field, along with the improvement of its reliability, thereby allowing the easy formation of a longer and planar (two dimensional) configuration, so that it is possible to provide the ink jet recording head portion which is easily made the multi-nozzle and high density package, with an excellent productivity at mass production and at a lower manufacturing cost.

In this way, the ink jet recording head portion using the electricity-heat converter as the energy generating means and manufactured through the semiconductor manufacturing process generally comprises the electricity-heat converter as means for forming fine liquid droplets by discharging the liquid through ink discharge ports with the thermal energy acted onto the liquid filling each liquid channel, which is provided corresponding to each discharge port, and in which the liquid is supplied to each liquid channel from the common liquid chamber communicating to each liquid channel.

Note that for the manufacturing method of ink discharge portion, a method has been proposed of forming at least the liquid channel by providing a solid layer for forming at least the liquid channel and an activated energy line curable material layer for use in forming at least the wall of the liquid channel on a first substrate, and after lamination of a second substrate, laminating a mask on the second substrate, curing at least the wall of the liquid channel of the activated energy line curable material layer as a constitutional portion by radiating an upper portion of the mask with the activated energy line, and further removing the uncured portion of the solid layer and the activated energy line curable material layer from between two substrates (see Japanese Patent Application Laid-Open No. 62-253457).

Figure 4:
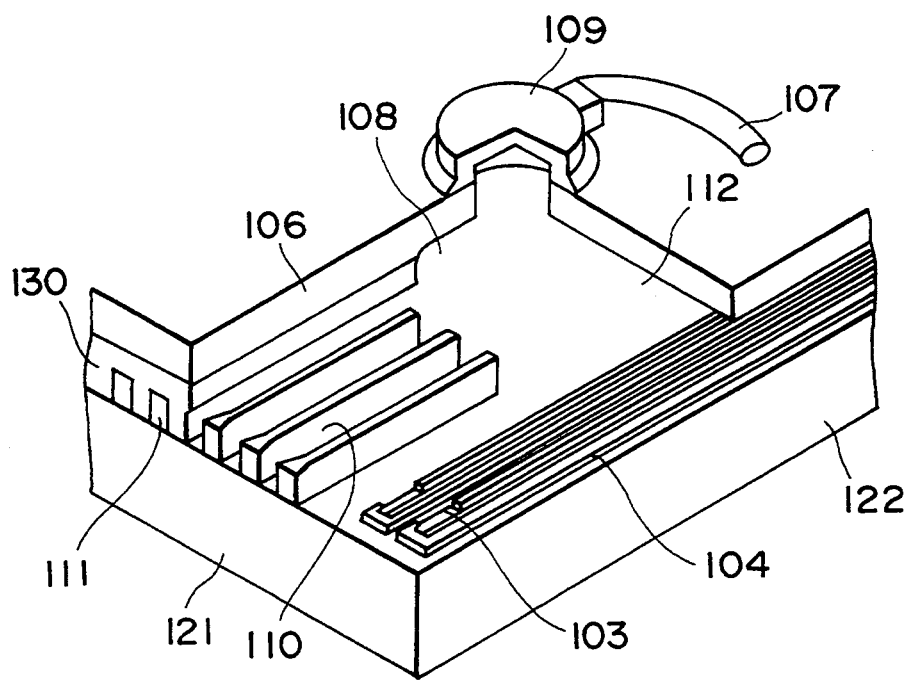
FIG. 4 is a perspective view showing the constitution of a recording head.

FIG. 4 shows schematically a constitution of the above-described ink jet recording head portion. The recording head portion 121 is constituted of the electricity-heat converters 103, the electrodes 104, the cured activated energy line curable material layer 130 having the liquid channel 110, and a ceiling plate 106, which are formed as the film on a substrate 122 of the first substrate via the semiconductor manufacturing process such as etching deposition or sputtering. However, such recording head portion 121 contains the recording liquid 112 supplied from a liquid reservoir, not shown, through a liquid supply tube 107 to the common Liquid chamber 108.

109 is a liquid supply tube connector. The recording liquid 112 passed into the common liquid chamber 108 is supplied into the liquid channel 110 with the capillary phenomenon, and is stably held by the meniscus formed in the ink discharge port 111 at leading end of the liquid channel. Thus, the liquid on the electricity-heat converter face is heated by turning on the electricity of the electricity-heat converter 103, causing the bubble formation phenomenon with the film boiling, and by growth of bubbles, liquid droplets are discharged through the ink discharge port 111. With the above constitution, the ink jet recording head portion of the multi-nozzle can be formed in the arrangement of liquid channels at such a high discharge port density as 400 dots/inch.

It should be noted that the recording apparatus according to the present invention has preferably the ink jet recording head portion as above described, but may have another recording head portion based on the thermal transfer method, thermosensible method or sublimable thermal transfer method, for example.

FIG. 5 is a block diagram showing a receiving control unit 396 and a recording control unit 397 of the control substrate 3 as shown in FIG. 1.

A line control unit 398 serves for the detection of a call signal from the public line, and the connection and disconnection of the line. A demodulation device 399 demodulates the facsimile data modulated and transmitted thereto for conversion into the binary format usable within the apparatus, and this is a so-called modem.

CPU-A 400 controls the line control unit 398 and the demodulation device 399.

401 is a receiver buffer in which image data received by a receiving control unit, not shown, is stored at any time. In this example, the receiver buffer 401 is necessary to have a capacity as large as the total number of recording elements N for the recording head because the image recording speed is greater than or equal to the image receiving speed on the average, and thus can be constructed by simple FIFO of small capacity. 402 is a converting buffer useful for storing N lines of image data received in a unit of line which can be recorded with one movement of the recording head (called one line), and picking up N dots of image data for each time sequentially along with the movement of the head, in which assuming that the number of dots corresponding to a recordable width of the recording apparatus is L, the converting buffer has a capacity of N×L bits, and so can be constituted of the memory element such as an ordinary DRAM. 403 is a head driver which is a power element for driving the recording head 405, i.e., selectively driving the elements of the recording head 405, based on N dots of image data received from CPU-B 404. The recording head 405, which is integrally provided on the head cartridge as previously described, makes the recording by forming fine liquid droplets by the use of the thermal energy, with N dots recorded at a time. A carrier motor driver 407 and a sheet feed motor driver 406 serve to drive the carrier motor 31 and the sheet feed motor as previously described, which can move the recording head mounted on the carrier 11 and convey the recording sheet. CPU-B 404 controls the receiver buffer 401, the converting buffer 402, the head driver 403, the sheet feed motor driver 406, and the carrier motor driver 407, as well as transmitting and receiving or processing the image data.

Note that CPU-B 404 transmits and receives a control signal to and from the receiving control unit 396, and controls the recording unit by receiving a receiving start signal and a termination signal for 10 facsimile data transmitted from the receiving control unit 396, and a decision signal of whether received image is fine or normal.

Figure 6A:
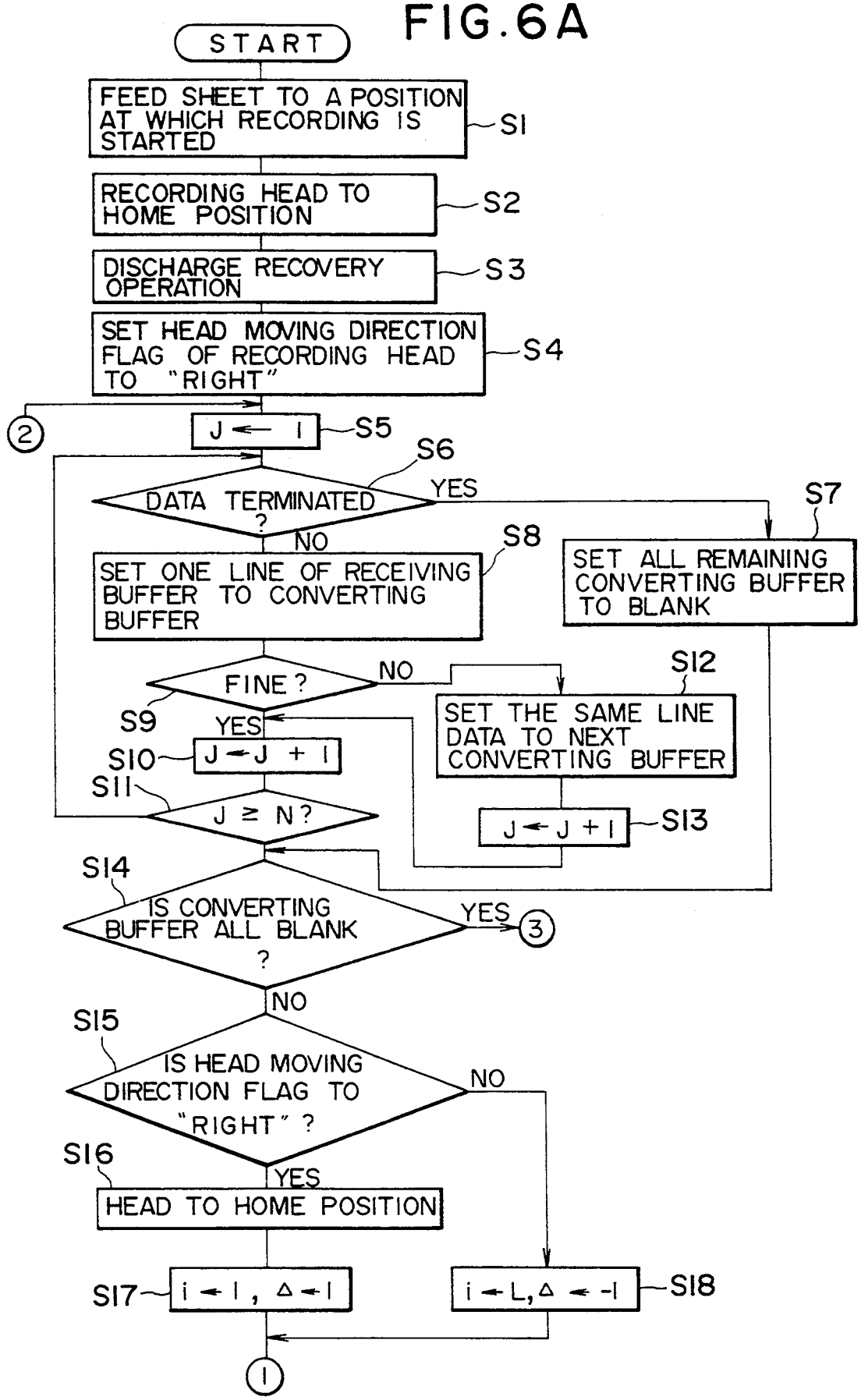
FIGS. 6A and 6B are flowcharts showing the control procedure with CPU-B 404 as shown in FIG. 5.
Figure 6B:
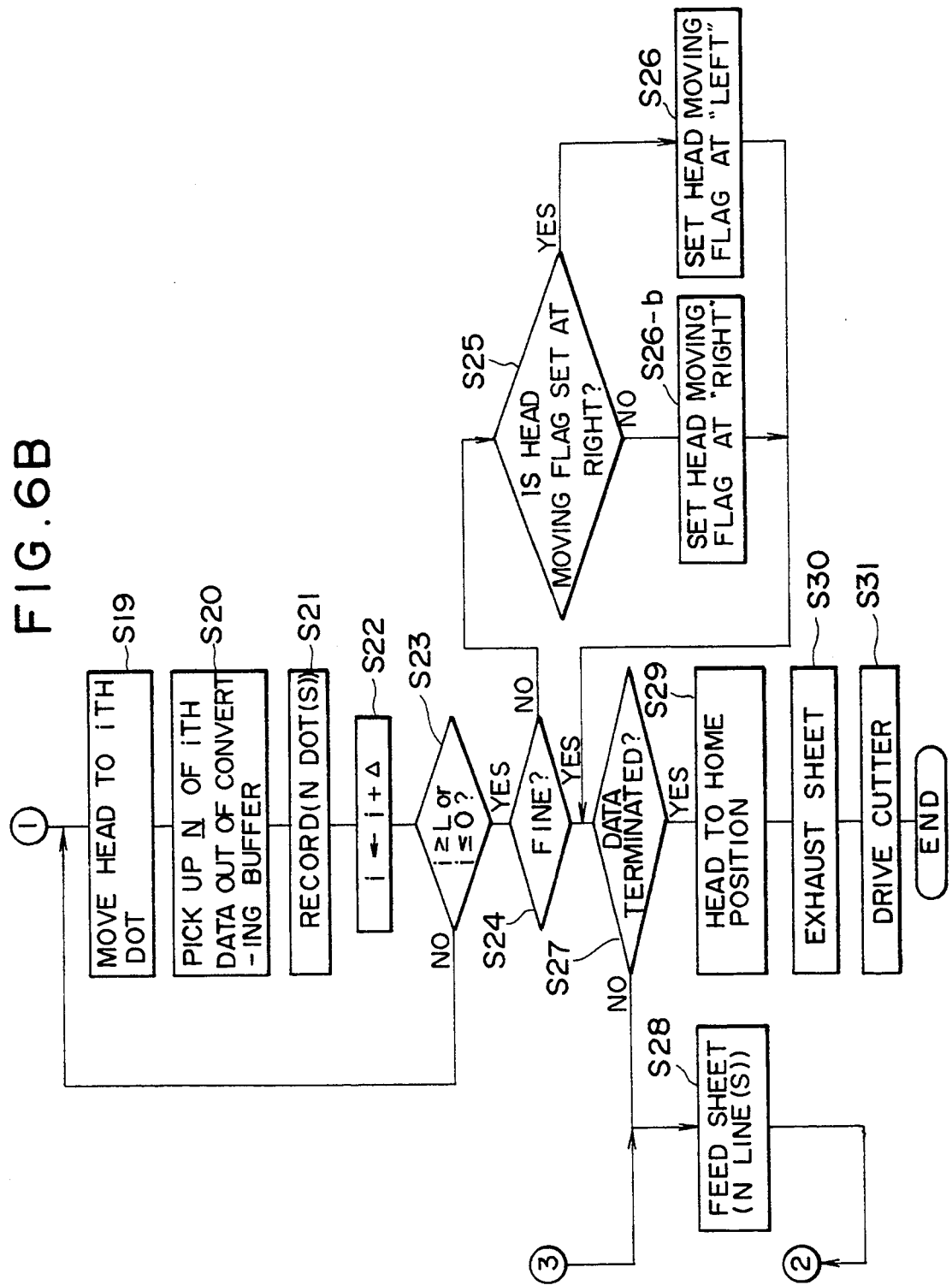

FIGS. 6A and 6B are flowcharts showing the control procedure of CPU-B 404 as shown in FIG. 5.

In an initial state before receiving and recording the image data, the sheet 2 has been introduced through a conveyance passage formed between the conveying roller 23 and the paper pan 37 into a recording position on a recording head moving passage, and a position immediately before a cutter 102 provided near an exhaust port 101 via the exhaust roller 41 and the spur 42.

This is a state when the recording of previous received image has been terminated.

If facsimile data is transmitted from the external public line in the above state, the line control unit 398 of the receiving control unit 396 detects a call signal, and if the apparatus is in a ready state for reception, CPU-A 400 instructs the line control unit 398 to connect the line. After connection of the line, the facsimile data is demodulated into the binary signal by the demodulation device 399.

The facsimile data has an additive information preceding the image data, in which CPU-A 400 determines whether received image is fine or normal from the additive information, and transmits its information to CPU-B 404 in the recording control unit 397.

If the reception of the additive information has been terminated, CPU-A 400 receives and demodulates the image data via the demodulation device 399 one line after another, and then starts the storage of image data into the receiver buffer 401.

In the following, the control procedure to be performed by the CPU-B 400 will be described with reference to FIGS. 6A and 6B. First, the step of conveying the sheet to a predetermined position for recording and the step of performing the discharge recovery process will be described.

At step S1, the control CPU-B 400 drives the conveying roller 23 with the conveying motor 35 at the same time when it receives a reception signal from the receiving control unit 396, in which the sheet is conveyed in a T4 direction as shown in FIG. 4 with a frictional force between the conveying roller 23 rotated in a T1 direction in FIG. 2 and based on a pressing force of the pinch roller 39 and the sheet 2. With this operation, a leading end of the sheet 2 is retracted from a position of the cutter 102, and if the leading end of the sheet reaches a predetermined position for recording, the conveying motor 35 is stopped to drive, and the conveyance of the sheet to the recording position is terminated. Next, at step S2, the carrier 11 having the recording head mounted is moved via the pulley 29 and the timing belt 27 to a home position with the driving of the carrier motor 31. At step S3, the previously described discharge recovery operation is performed to avoid the discharge failure in the subsequent recording, and at step S4, a moving direction flag of the recording head is set to "right" so that the recording at the first line can be made in a right direction from the home position.

Next, the step of storing data from the receiver buffer into the converting buffer will be described.

At step S5, a pointer j at the line set position of the converting buffer 401 is initialized, and at step S6, it is examined whether the facsimile data transmission and reception has been terminated.

As a result of examination, if terminated, the procedure proceeds to step S7 where blank data is set to all remaining converting buffer (N-j-1 lines), and then proceeds to step S14. As a result of examination at step S6, if not terminated, the procedure proceeds to step S8, where one line of received data stored in the receiver buffer 401 is set at the j-th line of the converting buffer 401. And at step S9, it is determined whether or not received data is fine, and if the received data is not fine, the procedure proceeds to step S12, where the same one line is set to the next converting buffer, and at step S13, the pointer j is incremented by plus one. On the other hand, if the result of determination at step S9 is fine, the procedure proceeds to step S10, where the pointer j is incremented. And at step S11, the pointer j is compared with the number of recording elements N, and the steps S6 to S11 are repeated until j exceeds N (N lines are set in the converting buffer).

And if j exceeds N, the procedure proceeds to step S14, where it is determined whether or not the converting buffer is all blank, and as a result of examination, if it is all blank, the procedure proceeds to step S28. This is to feed the sheet by predetermined lines, without moving and driving the head, to shorten the recording time if there is no recording data.

Next, the step of preparing for the recording in accordance with the print direction will be described.

At step S15, the head moving direction flag is examined, and as a result of examination, if the flag is set to a right moving direction (i.e., this is true for all cases of the fine recording and the right direction recording in the normal recording), the procedure proceeds to step S16, where the carrier motor 31 is driven to move the recording head mounted on the carrier 11 to the home position, and step S17, the pointer i at the head moving position is set to 1 and the movement interval is set to plus 1. Here, the point i is 1 when the head is located at the leftmost position, and L at the rightmost position, and corresponds to the recording position from 1 to L at intervals of the recording density. On the other hand, as a result of determination at step S15, if the flag is not set to the right direction (if in the left direction, 10 it is unnecessary to move the head as it is already located at the right end), the procedure proceeds to step S18, where the head moving pointer i is set to L corresponding to the dot at the rightmost end, and the movement interval $\Delta$ is set to $-1$. This is because in the left movement, the pointer i is changed from the rightmost end L to the leftmost end 1 for each step of $-1$.

Next, the step of recording line by line will be described.

At step S19, the recording head is moved to the i-th dot position by driving the carrier motor 31, and at step S20, N of image data corresponding to the i-th dot is picked up out of the converting buffer and transmitted to the head driver.

Figure 7:
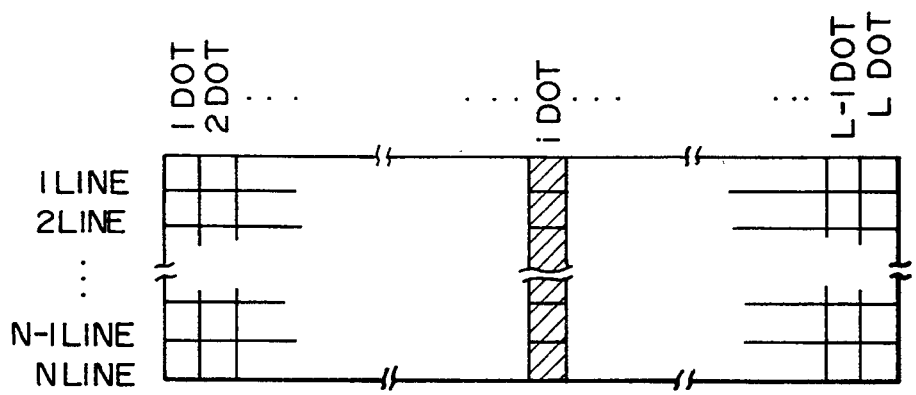
FIG. 7 is an explanation view for explaining a method of picking up N data out of a converting buffer.

A typical view of how to pick up N data out of the converting buffer is shown in FIG. 7. In FIG. 7, image data of N lines $\times$ L dots are stored in the converting buffer, in which the control is made such that N dots of data is picked up from the row corresponding to the pointer i in the line direction and transmitted to the head driver.

Next, at step S21, the recording head is driven by the head driver to discharge the ink using the electricity-heat converter as previously described for recording onto the sheet, and at step S22, the movement interval $\Delta$ is added to the pointer i to set the pointer at the next step. And at step S23, it is determined whether or not i is greater than or equal to L (for the movement in the right direction), or it is less than or equal to 0 (for the movement in a left direction), and as a result of determination, if neither case standards, the steps of S19 to S23 are repeated.

Next, the step of setting the head moving direction depending on whether or not the recording is fine will be described.

As a result of determination at step S23, if $i \geq L$ or $i \leq 0$ stands, the procedure proceeds to step S24, where it is determined whether or not the recording is fine. As a result of determination, if it is not fine, the procedure proceeds to step S25, where it is determined whether or not the current moving direction flag is the right direction. As a result of determination, if the head moving flag is the right direction, the procedure proceeds to step S26, where the head moving flag is set to the left direction, then proceeding to step S27. On the other hand, as a result of determination at step S25, if the head moving flag is not the right direction, the procedure proceeds to step S25-b, where the head moving flag is set to the right direction, then proceeding to step S27.

Next, the subsequent control depending upon whether or not there is reception terminating information will be described below. At step S27, it is determined whether or not the reception terminating information output from the receiving control unit, and as a result of determination, if it is not, the procedure proceeds to step S28, where the sheet is fed in the T3 direction as shown in FIG. 1 to enable the recording of next line by driving the conveying motor 35 and turning the conveying roller 23 in the T2 direction as shown in FIG. 2. Here, the amount of feeding the sheet is N lines. Afterwards, the procedure returns to step S5, and the above steps are repeated.

On the other hand, as a result of determination at step S27, if the reception terminating information is output, the recording head 405 is returned to the home position at step S29, because the termination of recording is indicated, and after feeding the sheet by a predetermined amount, the sheet having the image recorded is cut by driving the cutter 102 located above the sheet exhausting roller 41 and the spur 42, and the procedure is terminated.

Note that in the above operation, the discharge recovery processing as previously described can be performed in any step at appropriate time intervals. Also, as the average recording speed of the above operation exceeds the reception speed, the overflow of the receiver buffer will not occur.

With the above constitution of this example, the disadvantages as described can be eliminated such that the improvement of the recording speed is considered mainly for the recording of normal image, in which the speed is increased by enabling the two-way recording only at the normal recording, while at the fine reception requiring the improvement of recording quality, the one-way recording is enabled, whereby the normal recording is allowed at a speed twice that at the fine recording, and the quality of fine record image can be improved. One-way or unidirectional recording means recording in one direction. For example, the recording head can be moved forward relative to the recording medium from left to right in the main scan direction, while recording. Two-way or bidirectional recording means reciprocal recording in both forward and reverse directions. For example, the recording head can be moved relative to the recording medium from left to right and, in the return scan, right to left in the main scan direction, while recording in both directions.

This example was described using the recording head with the method of recording with fine liquid droplets formed by the use of the thermal energy and of the cartridge type provided integrally therewith, but the present invention is not limited to this example, and the following examples as (1) to (5) can be fulfilled.

(1) If the average recording speed exceeds the receiving speed, the recording head using the ink jet method of piezoelectric type, thermosensible method, thermal transfer method, or dot impact method, for example, can be mounted.

(2) As to the type or number of recording heads to be mounted, besides a single head corresponding to a monochromatic ink as shown in the example, a plurality of heads can be provided corresponding to a plurality of inks differing in the ink density or recording color to improve the recording quality at half tone density or cope with a color facsimile equipment.

(3) While in this example, the reception is made asynchronously with the recording by the receiving control unit separately provided, the CPU can be used for the receiving control as well as the recording control, in which an interrupt can be caused, for example, by sensing the termination of receiving one line, thereby to perform both the receiving and recording controls at the same time apparently.

(4) While in this example, the sheet is wound as the roll, the sheet conveying system can be provided in which many sheets (cut sheets) cut at a defined length are loaded and conveyed to the recording position after separation into one sheet. In this case, the cutter is not necessary.

(5) While in this example, the image density is fine or normal, this example can be applied to the facsimile equipment which can receive the image at a so-called super fine recording density, the sub scan density of which is twice that as the fine (with a line interval or 1/15.4 mm).

That is, a serial recording apparatus can be constructed in such a way as to enable the recording in the two-way movement of the recording head when the pixel density is normal or fine, and in the one-way movement at the super fine, or enable the recording in the two-way movement of the recording head when the pixel density is normal, and in the one-way movement when it is fine or super fine.

Moreover, the present invention can be also applied to a facsimile equipment for receiving and recording image at a minute pixel density than at the super fine.

As above described, according to the present invention, it is possible to form an image at a sufficient recording accuracy and an excellent quality of image, with reduced running and product costs, owing to the above constitution.

That is, according to the present invention, when the recording is made at high resolution, a sufficient recording accuracy and an image quality can be attained as the recording head is enabled to record in the one-way movement, while when the recording is made at lower resolution than the above high resolution, a faster recording speed can be obtained as the recording head is enabled to record in the two-way movement, and correspondingly, the occupying time of the line can be decreased, so that the public line due can be made at a lower price and the running cost can be reduced. Further, according to the present invention, when the recording is made at a lower resolution than the above high resolution, the capacity of receiver buffer can be reduced as the recording speed can be made faster, and so the product cost can be reduced.

A preferred recording head for use in the present invention is one of the ink jet method of recording by forming fine liquid droplets by the use 10 of the heat energy among the various ink jet recording systems.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleate boiling corresponding to the recording information on electricity-heat converters arranged corresponding to the sheets or liquid channels holding liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) though an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic.

As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-heat converter (linear liquid channel or right angle liquid channel) as disclosed in the above-mentioned respective specifications, the constitution by use of U.S. Pat. Nos. 4,558,333, 4,459,600 disclosing the constitution having the heat acting portion arranged in the flexed region can be also used.

In addition, the present invention can be also effective with the constitution as disclosed in Japanese Patent Application Laid-Open No. 59-123670 which discloses the constitution using a slit common to a plurality of electricity-heat converters as the discharging portion of the electricity-heat converter or Japanese Patent Application Laid-Open No. 59-138461 which discloses the constitution having the opening for absorbing pressure waves of heat energy correspondent to the discharging portion.

In addition, the present invention is effective for a recording head of the freely exchangeable chip type which enables electrical connection to the main device or supply of ink from the main device by being mounted on the main device, or for a recording head of the cartridge type having an ink tank provided integrally on the recording head itself.

Also, addition of a restoration means for the recording head, a preliminary auxiliary means, etc. is preferable, because the effect of the present invention can be further stabilized. Specific examples of these may include, for the recording head, capping means, cleaning means, pressurization or aspiration means, electricity-heat converters or another heating elements or preliminary heating means according to a combination of these, and it is also effective for performing stable recording to perform preliminary mode which performs discharging separate from recording.

Further, the recording mode of the recording device is effective for not only the recording mode only of a primary color such as black etc., but also a device equipped with at least one of plural different colors or full color by color mixing, whether the recording head may be either integrally constituted or combined in plural numbers.

Though the ink is considered as the liquid in the examples of the present invention as described above, the present invention is applicable to the ink solidifying at or below room temperature, and liquefying or liquid at the room temperature, or the ink liquefying when a recording enable signal is issued, as the viscosity of ink is generally controlled to be maintained within a certain range for stable discharge by adjusting the temperature of ink in a range from 30° C. to 70° C. in the above ink jet method.

In addition, in order to avoid the temperature elevation due to the heat energy by positively utilizing it as the energy for the change of state of ink from solid to liquid, or to prevent the evaporation of ink by the use of the ink being solid in the shelf state, the ink having a property of becoming liquid only with the application of heat energy, such as that which can be discharged as liquid since it liquefies with the application of heat energy in accordance with a recording signal or solidifies upon reaching a recording medium, can be also used. In this case, the ink may be in the form of being held in recesses or through holes of porous sheet as liquid or solid matter, and opposed to electricity-heat converters, as described in Japanese Patent Application Laid-Open No. 54-56847 or Japanese Patent Application Laid-Open No. 60-71260. The most effective method for inks as above described in the present invention is one based on the film boiling as above indicated.

Further, the form of the recording device according to the present invention, in addition to being provided integrally or separately as an image output terminal for the information processing equipment such as a computer or word processor, can be embodied as a copying machine in combination with a reader, and further, a facsimile terminal equipment having the transmission and reception feature.

Figure 8:
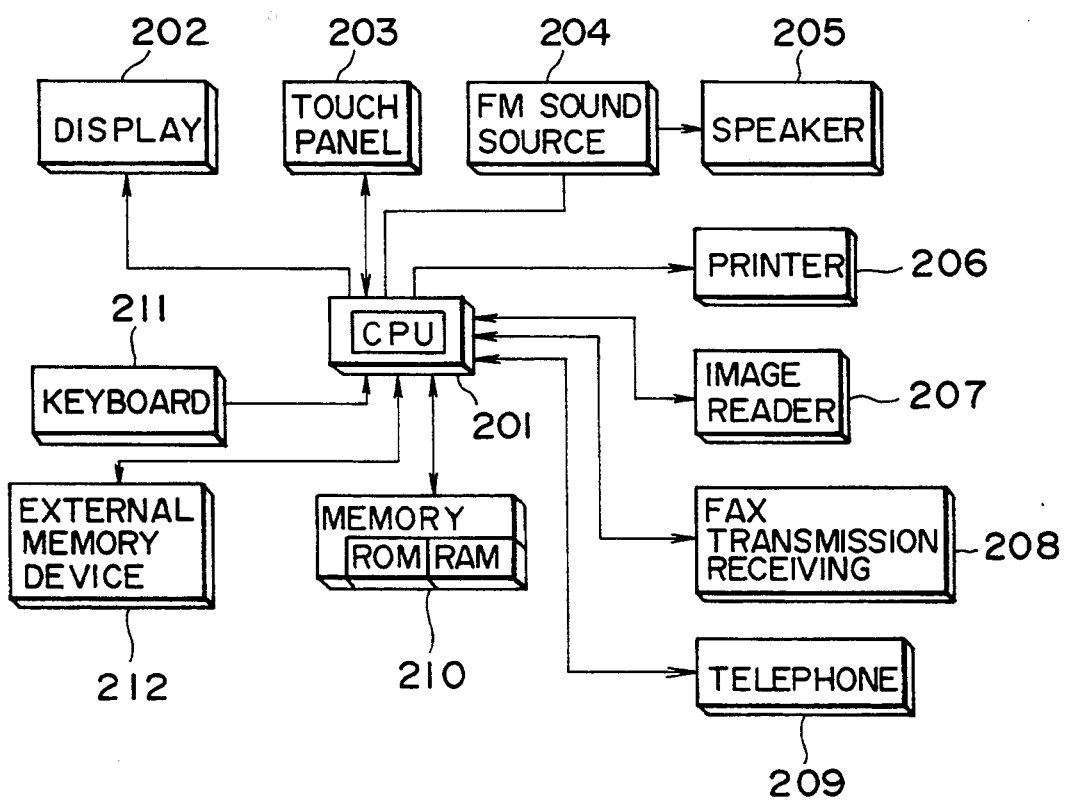
FIG. 8 is a block diagram showing a schematic configuration in which a serial recording apparatus of the present invention is applied to an information processing apparatus.

FIG. 8 is a block diagram showing a schematic configuration in which an ink jet recording apparatus of the present invention is applied to the information processing apparatus having the feature of word processor, personal computer, facsimile terminal equipment, copying machine, and electronic typewriter.

In the figure, 201 is a control unit for controlling the whole apparatus, wherein it comprises a CPU such as a microprocessor with various I/O ports, and controls each section by outputting or inputting a control or data signal to or from each section, respectively. 202 is a display section which displays various menus, document information, and image data read with an image reader 207 on the display screen. 203 is a transparent, pressure sensitive touch panel provided on the display section 202, which enables the entry of items or coordinate values on the display section 202 by depressing its surface with a finger or the like.

204 is a FM (Frequency Modulation) sound source section, which makes the FM modulation by storing the music information created with a music editor in a memory 210 and an external storage device 212 as the digital data and reading data from the memory or external storage device. An electrical signal from the FM sound source section 204 is converted into an audible sound by a speaker section 205. A printer section 206 is a recording apparatus as the output terminal for a word processor, personal computer, facsimile terminal equipment, or copying machine.

207 is an image reader section which inputs original data by reading it photoelectrically, and is provided on the way of conveying path of original to read facsimile or copying original, and other various kinds of originals. 208 is a facsimile (FAX) transmission or reception section for transmitting original data read by the image reader section 207 with the facsimile or receiving and decoding facsimile signals transmitted, having an interface facility with the outside. 209 is a telephone section, comprising various telephone features, such as ordinary telephone function or automatic answering telephone function.

210 is a memory section comprising a ROM for storing system programs, manager programs and other application programs, character fonts, and dictionaries, as well as application programs loaded from the external storage device 212, document information, and a video RAM.

211 is a keyboard section for inputting document information or various commands.

212 is the external storage device, which is a floppy disk or hard disk as the storage medium, used to store document information, music or audio data, and user's application programs.

Figure 9:
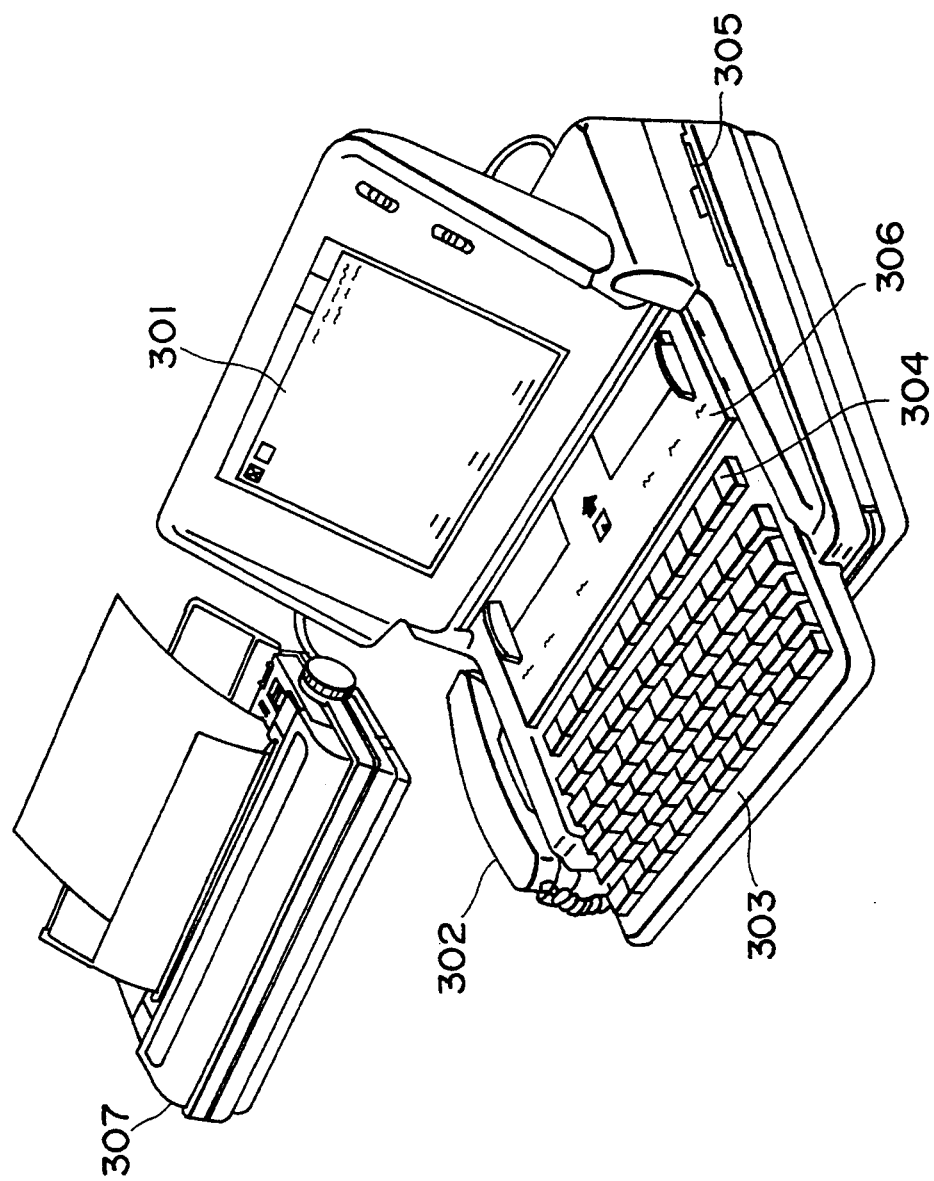
FIG. 9 is an external view of the information processing apparatus as shown in FIG. 8.

FIG. 9 is an external view of the information processsing apparatus as shown in FIG. 8.

In the figure, 301 is a flat panel display using a liquid crystal for displaying various menus, graphic data or document information. On this display 301 is installed the touch panel 203, which enables the entry of coordinates or items specifications by depressing a surface of the touch panel 203 with a finger or the like. 302 is a handset to be used when the apparatus functions as a telephone.

The keyboard 303 is detachably connected via a cord to the main body, and is used to input various kinds of document information or data. The keyboard 303 is also provided with various types of function keys 304. 305 is an opening for insertion of the floppy disk into the external storage device 212.

306 is a paper setting board for setting a paper to be read by the image reader section 207, in which a read original is exhausted from a rear portion of the device. In the facsimile reception, it is recorded by an ink jet printer 307.

The display section 202 as shown in FIG. 8 may be a CRT, but is preferably a flat panel of liquid crystal display using a ferroelectric liquid crystal, because it can make the apparatus smaller, thinner, and lighter.

When the above mentioned information processing unit is operated as a personal computer or word processor, various kinds of information input from the keyboard 211 are processed according to a predetermined program in the control section 201, and output to the printer section 206 as the image.

When it is operated as a receiver for the facsimile terminal equipment, the facsimile information input from the FAX transmission and reception section 208 via the transmission line are received and processed according to a predetermined program in the control section 201, and output to the printer section 206 as a received image.

And when it is operated as a copying machine, an original is read by the image reader section 207, and read original data is output via the control section 201 to the printer section 206 as a copied image. Note that it is operated as a transmitter for the facsimile terminal equipment, original data that was read by the image reader section 207 is processed for transmission according to a predetermined program in the control section 201, and transmitted via the FAX transmission and reception section 208 to the transmission line.

Figure 10:
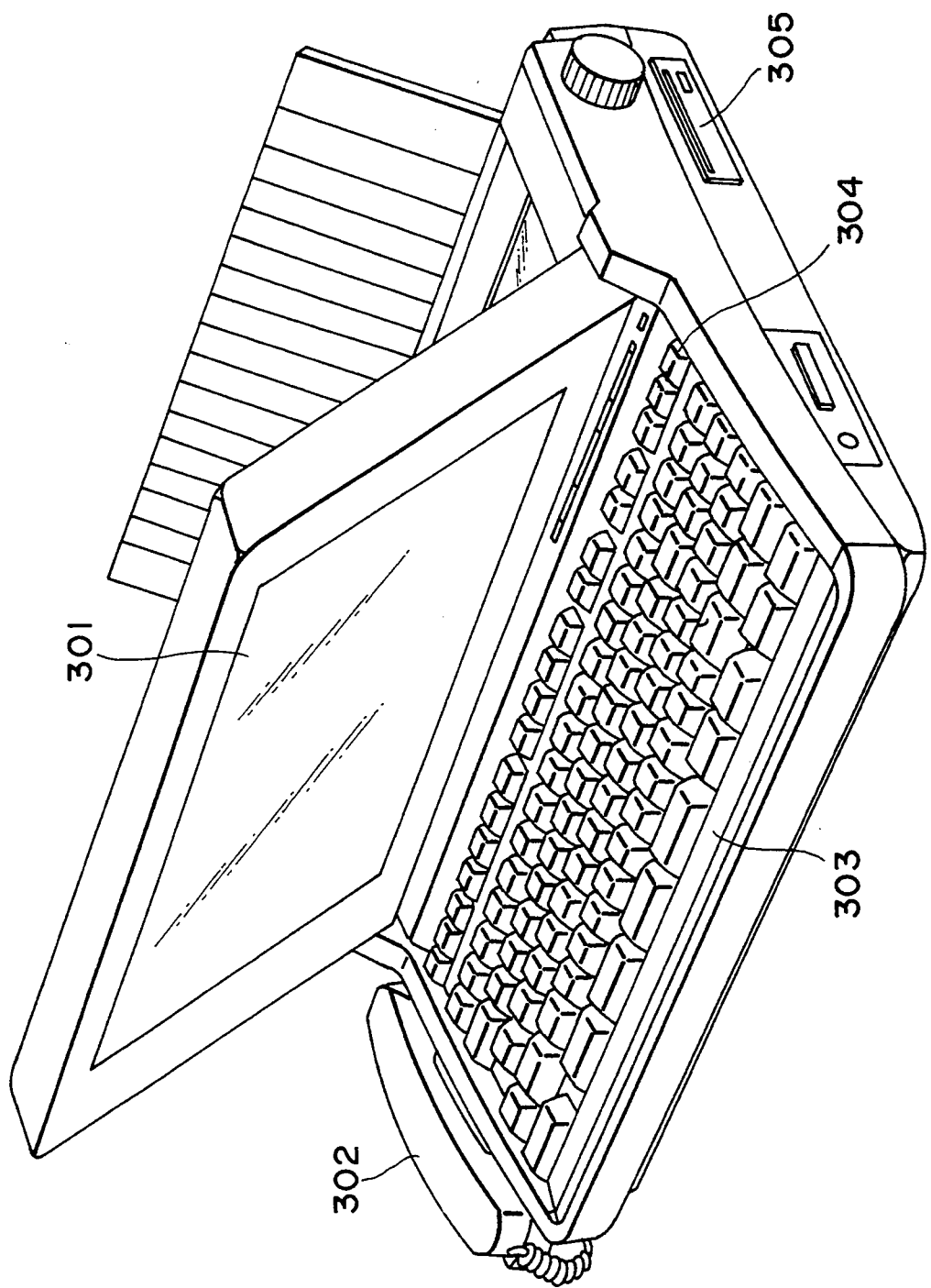
FIG. 10 is an external view showing another example of information processing apparatus.

It should be noted that the above mentioned information processing device can be constituted as the integral type having an ink jet printer contained within the main body, as shown in FIG. 10, in which its portability can be further enhanced. In the same figure, like reference numerals are affixed to parts having the same functions as those in FIG. 9.

Thus, the product and running cost can be reduced by applying the recording apparatus according to the present invention to the multifunctional information processing device as above described.

What is claimed is:

1. A serial recording apparatus for recording onto a recording medium during relative movement of a recording head, in which a plurality of recording elements are arranged, and the recording medium in a main-scan direction and a sub-scan direction, which are orthogonal to each other, said apparatus comprising:

a receiving unit for receiving a recording signal including information of pixel density, the receiving unit receiving the recording signal through a line; and recording control means for enabling said recording head to effect one-way or two-way recording depending on the information of pixel density received by said receiving unit, wherein one-way recording is recording during relative movement of said recording head and the recording medium in a forward main-scan direction, while two-way recording is recording during relative movement of said recording head and the recording medium in forward and reverse main-scan directions, and said recording head is enabled to effect one-way recording if the information of pixel density indicates recording at high pixel density, while said recording head is enabled to effect two-way recording if the information of pixel density indicates recording at a lower pixel density than the high pixel density, wherein when the information of pixel density is lower than a recording density of the recording head, a plurality of recording elements of the recording head correspond to the information of pixel density to perform recording.

2. A serial recording apparatus according to claim 1, wherein a plurality of recording elements of the recording head forms one pixel when the information of the pixel density is lower than the high pixel density.

3. A serial recording apparatus according to claim 1, wherein the high pixel density has an image density twice as high as the lower pixel density.

4. A serial recording apparatus according claim 3, wherein the pixel density corresponds to a recording density of the recording head when the pixel density is the high pixel density.

5. A serial recording apparatus according to claim 4, wherein two recording dots of the recording head form one pixel when the pixel density is the lower pixel density.

6. A serial recording apparatus according to claim 1, wherein the information of pixel density is received as additive information preceding image data among recording signals received by said receiving unit.

7. A serial recording apparatus according to claim 1, further comprising a receiver buffer for storing temporarily recording signals received by said receiving unit.

8. A serial recording apparatus according to claim 1, wherein said recording head comprises an ink jet recording head for recording by discharging ink.

9. A serial recording apparatus according to claim 8, wherein said recording head comprises a recording head which discharges the ink by use of thermal energy, and comprises electricity-heat converters for generating the thermal energy applied to the ink.

10. A serial recording apparatus according to claim 9, wherein said recording head discharges the ink through discharge ports by using a pressure variation caused by growth and shrinkage of bubbles which are produced with film boiling generated by the thermal energy applied by said electricity-heat converters.

11. An image forming apparatus for recording onto a recording medium during relative movement of a recording head, in which a plurality of recording elements are arranged, and the recording medium in a main-scan direction and a sub-scan direction, which are orthogonal to each other, said apparatus comprising:
 a receiving unit for receiving a recording signal including information of pixel density, the receiving unit receiving the recording signal through a line;
 recording control means for enabling said recording head to effect one-way or two-way recording depending on the information of pixel density received by said receiving unit, wherein one-way recording is recording during relative movement of said recording head and the recording medium in a forward main-scan direction, while two-way recording is recording during relative movement of said recording head and the recording medium in forward and reverse main-scan directions, and said recording head is enabled to effect one-way recording if the information of pixel density indicates recording at high pixel density, while said recording head is enabled to effect two-way recording if the information of pixel density indicates recording at a lower pixel density than the high pixel density, wherein when the information of pixel density is lower than a recording density of the recording head, a plurality of recording elements of the recording head correspond to the information of pixel density to perform recording;
 an image reader unit; and
 a transmission unit.

12. A serial recording apparatus for recording onto a recording medium during relative movement of a recording head, in which a plurality of recording elements are arranged, and the recording medium in a main-scan direction and a sub-scan direction, which are orthogonal to each other, said apparatus comprising:
 a receiving unit for receiving a recording signal, the receiving unit receiving the recording signal through a line;
 recording control means for enabling said recording head to effect one-way recording if the recording signal received by said receiving unit is a signal indicating recording of an image at a high resolution, or for enabling said recording head to effect two-way recording if the recording signal is a signal indicating recording of an image at a lower resolution than said high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to recording.

13. A serial recording apparatus according to claim 12, further comprising a receiver buffer for storing temporarily recording signals received by said receiving unit.

14. A serial recording apparatus according to claim 12, wherein said recording signal contains a signal indicating the kind of resolution for an image to be recorded.

15. A serial recording apparatus according to claim 12, wherein said recording head comprises an ink jet recording head for recording by discharging ink.

16. A serial recording apparatus according to claim 15, wherein said recording head comprises a recording head which discharges the ink by use of thermal energy, and comprises electricity-heat converters for generating the thermal energy applied to the ink.

17. A serial recording apparatus according to claim 16, wherein said recording head discharges the ink through discharge ports by using pressure variation caused by growth and shrinkage of bubbles which are produced with film boiling generated by the thermal energy applied by said electricity-heat converters.

18. An image forming apparatus for recording onto a recording medium during relative movement of a recording head, in which a plurality of recording elements are arranged, and the recording medium in a main-scan direction and a sub-scan direction, which are orthogonal to each other, said apparatus comprising:
 a receiving unit for receiving a recording signal, the receiving unit receiving the recording signal through a line;
 recording control means for enabling said recording head to effect one-way recording if the recording signal received by said receiving unit is a signal indicating recording of an image at a high resolution, or for enabling said recording head to effect two-way recording if the recording signal is a signal indicating recording of an image at a lower resolution than said high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an a resolution lower than a recording resolution of the recording head, a plurality of recording elements recording head correspond to the image resolution to perform recording;
 an image reader unit; and
 a transmission unit.

19. A serial recording method for recording onto a recording medium during relative movement of a recording head, in which a plurality of recording elements are arranged, and the recording medium in a main-scan direction and a sub-scan direction, which are orthogonal to each other, said method comprising the steps of:

receiving a recording signal through a line; and enabling said recording head to effect one-way recording if a recording signal received indicates recording of an image at a high resolution, or enabling said recording head to effect two-way recording if the recording signal indicates recording of an image at a lower resolution than the high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to perform recording.

20. A serial recording method according to claim 19, wherein said recording method is for use with facsimile communication.

21. A serial recording apparatus for recording onto a recording medium during relative movement of a recording head, in which a plurality of recording elements are arranged, and the recording medium in a main-scan direction and a sub-scan direction, which are orthogonal to each other, said apparatus comprising:

a receiving unit for receiving a recording signal, the receiving unit receiving the recording signal through a line; and recording control means for enabling said recording head to effect one-way or two-way recording depending on a pixel density indicated by the recording signal received by said receiving unit wherein one-way recording is recording during relative movement of said recording head and the recording medium in a forward main-scan direction, while two-way recording is recording during relative movement of said recording head and the recording medium in forward and reverse main-scan directions, and said recording head is enabled to effect one-way recording if the pixel density indicates recording at high pixel density, while said recording head is enabled to effect two-way recording if the pixel density indicates recording at a lower pixel density than the high pixel density, wherein when the recording signal indicates pixel density lower than a recording density of the recording head, a plurality of recording elements of the recording head correspond to the pixel density to perform recording.

22. A serial recording apparatus according to claim 21, wherein the recording head is integral with an ink supply tank, and is in the form of a cartridge detachable from a serial recording apparatus main body.

23. A serial recording method according to claim 13, wherein the recording head comprises an ink jet recording head for recording by discharging ink.

24. A serial recording method according to claim 23, wherein the recording head comprises a recording head which discharges the ink by use of thermal energy, and comprises electricity-heat converters for generating the thermal energy applied to the ink.

25. A serial recording method according to claim 24, wherein the recording head discharges the ink through discharge ports by using a pressure variation caused by growth and shrinkage of bubbles which are produced with film boiling generated by the thermal energy applied by the electricity-heat converters.

26. A serial recording apparatus according to claim 21, wherein the recording head comprises an ink jet recording head for recording by discharging ink.

27. A serial recording apparatus according to claim 26, wherein the recording head comprises a recording head which discharges the ink by use of thermal energy, and comprises electricity-heat converters for generating the thermal energy applied to the ink.

28. A serial recording apparatus according to claim 27, wherein the recording head discharges the ink through discharge ports by using a pressure variation caused by growth and shrinkage of bubbles which are produced with film boiling generated by the thermal energy applied by the electricity-heat converters.

29. An image forming apparatus for forming an image on a recording medium during relative movement of a recording head, in which a plurality of recording elements are arranged, and the recording medium in a main scan direction and a sub-scan direction, which are orthogonal to each other, said apparatus comprising:

image reading means for reading an image;

a receiving unit for receiving a recording signal, said receiving unit receiving the recording signal through a line;

recording control means for enabling said recording head to effect one-way recording if the recording signal received by said receiving unit is a signal indicating recording of an image at a high resolution, or for enabling said recording head to effect two-way recording if the recording signal is a signal indicating recording of an image at a lower resolution than said high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to perform recording.

30. An image forming apparatus for forming an image on a recording medium during relative movement of a recording head, in which a plurality of recording elements are arranged, and the recording medium in a main scan direction and a sub-scan direction, which are orthogonal to each other, said apparatus comprising:

means for inputting a recording signal;

a receiving unit for receiving the recording signal, said receiving unit receiving the recording signal through a line;

recording control means for enabling said recording head to effect one-way recording if the recording signal received by said receiving unit is a signal indicating recording of an image at a high resolution, or for enabling said recording head to effect two-way recording if the recording signal is a signal indicating recording of an image at a lower resolution than said high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to perform recording.

31. An information processing apparatus for forming an image on a recording medium during relative movement of a recording head, in which a plurality of recording elements are arranged, and the recording medium in a main scan direction and a sub-scan direction, which are orthogonal to each other, said apparatus comprising:

means for calculation processing;

a receiving unit for receiving a recording signal, said receiving unit receiving the recording signal through a line;

recording control means for enabling said recording head to effect one-way recording if the recording signal received by said receiving unit is a signal indicating recording of an image at a high resolution, or for enabling said recording head to effect two-way recording if the recording signal is a signal indicating recording of an image at a lower resolution than said high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to perform recording.

32. A method for shortening a line occupying time in a serial recording process for recording onto a recording medium during relative movement of a recording head, in which a plurality of recording elements are arranged, and the recording medium in a main-scan direction and a sub-scan direction, which are orthogonal to each other, said method comprising the steps of:

receiving a recording signal through a line; and enabling said recording head to effect one-way recording if a recording signal received indicates recording of an image at a high resolution, or enabling said recording head to effect two-way recording if the recording signal indicates recording of an image at a lower resolution than the high resolution, wherein one-way recording is recording during relative movement of said recording head and the recording medium in a forward main-scan direction, while two-way recording is recording during relative movement of said recording head and the recording medium in forward and reverse main-scan directions, wherein when the recording signal indicates recording of an image of a resolution lower than a recording resolution of the recording head, a plurality of recording elements of the recording head correspond to the image resolution to perform recording.

* * * * *